Figure 1:
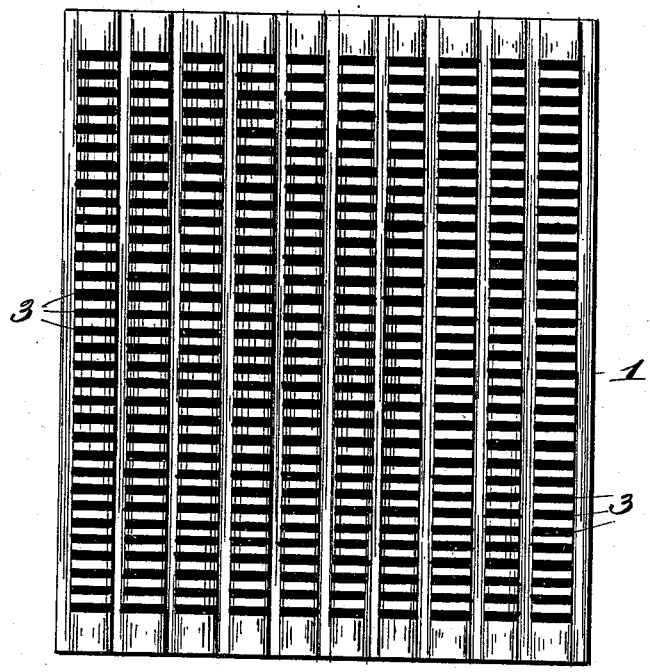

(No Model.)

T. A. WILLARD.
STORAGE BATTERY.

No. 532,128. Patented Jan. 8, 1895.

Witnesses:
Wm E Coulter
J. A. Willson.

Inventor:
Theodore A Willard
by H. P. Willson
attorney.

UNITED STATES PATENT OFFICE.

THEODORE A. WILLARD, OF NORWALK, OHIO.

STORAGE-BATTERY.

SPECIFICATION forming part of Letters Patent No. 532,128, dated January 8, 1895.

Application filed January 5, 1894. Serial No. 495,820. (No model.)

*To all whom it may concern:*

Be it known that I, THEODORE A. WILLARD, a citizen of the United States, residing at Norwalk, in the county of Huron and State of Ohio, have invented certain new and useful Improvements in Storage-Batteries; and I do hereby declare the following to be a full, clear, and exact description of the invention, such as will enable others skilled in the art to which it appertains to make and use the same.

My invention has relation to storage batteries and accumulators and among the objects in view is to provide a simple, cheap and efficient non-conducting sheath, cell or cover for the electrode whereby a perfect and free circulation of the electrolytic fluid is permitted and the falling apart or disintegration of the active material of the electrode prevented, and with the above objects in view.

The invention consists in the improved sheath, cell, or cover for the electrode as hereinafter fully described, illustrated in the drawings and pointed out in the claim.

Figure 2:
Figure 3:
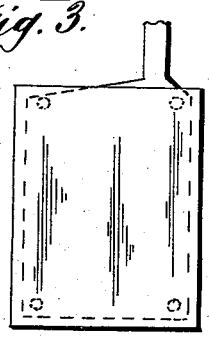
Figure 4:
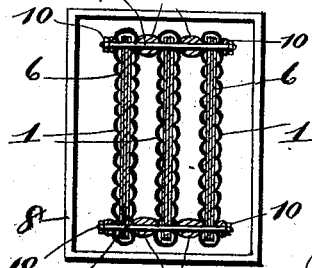

In the drawings:—Figure 1 is a side elevation of the non-conducting sheath, cell or cover. Fig. 2 is a horizontal section thereof. Fig. 3 is a side view showing the arrangement of the element. Fig. 4 is a horizontal section of a cell showing the manner of arranging and connecting several of the elements together.

In carrying out my invention I construct a sheath, cell or cover for the electrode whereby the disintegration of the active material thereof will be prevented and a free circulation of the electrolytic fluid permitted. For this purpose I provide the sheath, cell or cover 1, which may be made of any suitable non-conducting material that will not be affected by acid, as for instance hard rubber, gutta-percha, celluloid, &c. This sheath, cell or cover 1, is preferably formed in a matrix or mold and it is open at its top and closed at its bottom and its sides are corrugated as shown, forming a series of inwardly-projecting points or surfaces 2, which in practice serve to bear upon the active material of which the electrode is composed and thus form a support therefor which will prevent disintegration of the same.

The number of the corrugations in the sheath or cell may of course be varied within certain limits, and the dimensions and shape of the said sheath or cell may of course also be varied and will be dependent to some extent upon the size and shape of the battery cell within which said sheath is to be contained and also somewhat upon the size and shape of the electrode to be contained within the sheath.

For the purpose of allowing a perfect and free circulation of the electrolytic fluid I form within the sides of the sheath or cell 1, a number of slits or openings 3. These slits or openings I preferably form by means of gang-saws spaced at short intervals apart, the said sheath or cell being fed to the saws so that all the desired number of slits will be formed in the sheath at one operation. This method of producing the necessary slits for the circulation of the fluid I find to combine extreme cheapness with extreme lightness and strength of the sheath.

The slits formed as described will be long and narrow and extend horizontally of the sheath as shown. I find that this form of the slits not only serves to give extreme lightness to the sheath but by reason of their length a considerably greater surface of the active material will be exposed to the action of the electrolyte whereby the strength of the battery will be greatly increased.

The depth of the slits may of course be varied though in practice I would not make said slits to a greater depth than shown in the drawings, so that said slits will be somewhat removed from the active material and consequently will not readily clog up.

It will be noted that the before-mentioned inwardly-projecting supporting points or surfaces 2 are not slitted thereby affording a perfect support for the active material contained within the sheath.

It will be understood that I do not wish to be restricted to the formation of the slits by means of gang-saws as the said slits may be formed by and during the molding of the sheath itself. Such a method however does not possess the described advantages inherent to the formation of the slits by the saws.

The described sheath or cell may be adapted for use with any style or class of battery wherein active material is employed, that is to say, material to be acted upon by the electrolyte for the production of the electric current, as for instance the well-known Faure and other batteries, and therefore the material or materials entering into the composition of the said active matter or paste, forms no part of my present invention, and in Figs. 2 and 4 I simply show the electrodes in position within the sheaths or cells for the purpose of demonstrating the use of the latter and the advantages to be derived from such use. In said figures 6 designates the active material or paste applied to each side of the metal conducting strip or plate 7, the whole being arranged within the sheath or cell 1, and said active material being supported and held in position by means of the said sheath and particularly by the supporting points 2 thereof.

In practice it will be found that the usual slight expansion and contraction of the electrodes will be readily permitted so that warping or bending of the elements which is a frequent occurrence and resulting in the destruction of the battery will be avoided.

Any desired number of the described sheaths and their contained elements may be arranged within a battery cell, and in Fig. 4 I show three of the sheaths and their elements arranged within the cell 8.

The proper connection of the several elements may be accomplished in any of the well known ways and by any suitable means, as for instance by means of horizontal rods 9 passing through openings formed in the sheaths and electrodes, said rods being of any suitable insulating material as hard rubber, and being screw-threaded at their ends to receive clamping nuts 10, the insulation of the several elements from each other being effected by means of insulating rods or tubes 11 extending vertically between the sheaths. By this means the elements may be tightly clamped together thus making the cell compact and firm.

What I claim, and desire to secure by Letters Patent, is—

In a battery of the class described, the herein-described sheath, cell or cover 1, formed of non-conducting material said sheath, cell or cover having sides and ends integral with each other forming a substantially rectangular hollow cell or cover, and said sides being corrugated and provided with a series of horizontally-arranged slits or openings 3 and being also provided with a series of inwardly-projecting bearing points 2, as and for the purpose specified.

In testimony whereof I affix my signature in presence of two witnesses.

THEODORE A. WILLARD.

Witnesses:
 WM. H. HUSTED,
 M. F. BRAGDON.